US006354083B1

United States Patent
Shuttleworth et al.

(10) Patent No.: US 6,354,083 B1
(45) Date of Patent: Mar. 12, 2002

(54) AXIAL TWO-STROKE MOTORS

(75) Inventors: Richard Jack Shuttleworth; Jonathon Barton Rainey, both of Nelson (NZ)

(73) Assignee: Shuttleworth Axial Motor Company Limited, Nelson (NZ)

( * ) Notice: Subject to any disclaimer, the term of this patent is extended or adjusted under 35 U.S.C. 154(b) by 0 days.

(21) Appl. No.: 09/744,991

(22) PCT Filed: Aug. 19, 1999

(86) PCT No.: PCT/NZ99/00135

§ 371 Date: Apr. 13, 2001

§ 102(e) Date: Apr. 13, 2001

(87) PCT Pub. No.: WO00/11330

PCT Pub. Date: Mar. 2, 2000

(30) Foreign Application Priority Data

Aug. 19, 1998 (NZ) .................................................. 331455

(51) Int. Cl.[7] ................................................ F02B 33/44
(52) U.S. Cl. ......................................... 60/605.1; 66/597
(58) Field of Search ............................. 60/605.2, 605.1, 60/597; 123/564

(56) References Cited

U.S. PATENT DOCUMENTS

| | | | |
|---|---|---|---|
| 2,189,106 A | 2/1940 | Garve et al. | |
| 4,576,126 A | 3/1986 | Ancheta | |
| 4,864,979 A | 9/1989 | Eickmann | |
| 5,309,886 A | * 5/1994 | Hitomi et al. | .............. 60/605.2 |
| 5,711,154 A | * 1/1998 | Baechle et al. | ............ 60/605.2 |
| 5,878,703 A | 3/1999 | Sweeney | |

* cited by examiner

Primary Examiner—Hoang Nguyen
(74) Attorney, Agent, or Firm—Dennison, Scheiner & Schultz

(57) ABSTRACT

The present invention relates to an axial two-stroke motor (100) which includes an integral turbocharger (308). The motor (100) includes more than two cylinders (101–105) arranged in a substantially circular arrangement about a longitudinal axis (305) of an engine block (106). A chamber is disposed in the engine block (106) which forms an exhaust duct (307) and an intake duct (306). The turbocharger (308) is disposed in the chamber so that it is substantially located within the engine block (106). An exhaust turbine (107) of the turbocharger (308) resides substantially in the exhaust duct (307) and a compressor turbine (200) resides substantially in the intake duct (306).

9 Claims, 4 Drawing Sheets

AXIAL TWO-STROKE MOTORS

FIELD OF THE INVENTION

The present invention relates to two-stroke axial motors or engines and in particular to two-stroke motors or engines which incorporate turbochargers. The terms "motor" and "stroke" are used interchangeable with "engine" and "cycle".

BACKGROUND TO THE INVENTION

Over the years engine manufacturers have been working to improve the weight, size efficiency and manufacturing costs of engines. In part this has lead to the development of axial motors. An axial motor includes an engine block in which the cylinders are spaced evenly in a circular configuration about an axis of the engine block, rather than in the inline, "V" or horizontally opposed configurations of traditional engines. The reciprocal motion of the pistons in an axial motor can be transferred to rotational motion of an output shaft by way of a wobble plate configuration, such as that disclosed in NZ 221336.

Axial two-stroke motors or engines have been developed in various configurations to maximise the efficiency of air transfer to the combustion chamber. One technique employed has been to introduce a turbocharger. Some existing axial motors have turbochargers but they have been located externally to the cylinder block, with attendant construction and operational problems so that the full advantage of having a turbocharger associated with an axial motor has not yet been realised. One advantage provided by most axial motors is the compact design, however with external componentry such as an externally positioned turbocharger, this advantage is lost or minimised.

SUMMARY OF THE INVENTION

Therefore it is an object of the present invention to provide an axial two-stroke motor which has a more conveniently located turbocharger, or to overcome at least some of the difficulties associated with axial motors as stated above.

Accordingly the invention may be said to broadly consist in an axial two-stroke motor which includes an engine block with more than two cylinders spaced substantially evenly about an axis of the block. Each cylinder of the block has one or more exhaust ports.

Included within the block is a chamber which forms an exhaust duct and an intake duct. The motor also includes a turbocharger which has an exhaust turbine and compression turbine. The turbocharger is disposed substantially within the chamber such that the compression turbine is positioned substantially within the intake duct and the exhaust turbine is positioned substantially within the exhaust duct. The exhaust turbine is located such that exhaust from each exhaust port can drive the exhaust turbine.

BRIEF DESCRIPTION OF THE DRAWINGS

Preferred embodiments of the invention will be described with reference to the drawings of which.

DETAILED DESCRIPTION OF THE PREFERRED EMBODIMENTS

Figure 1:
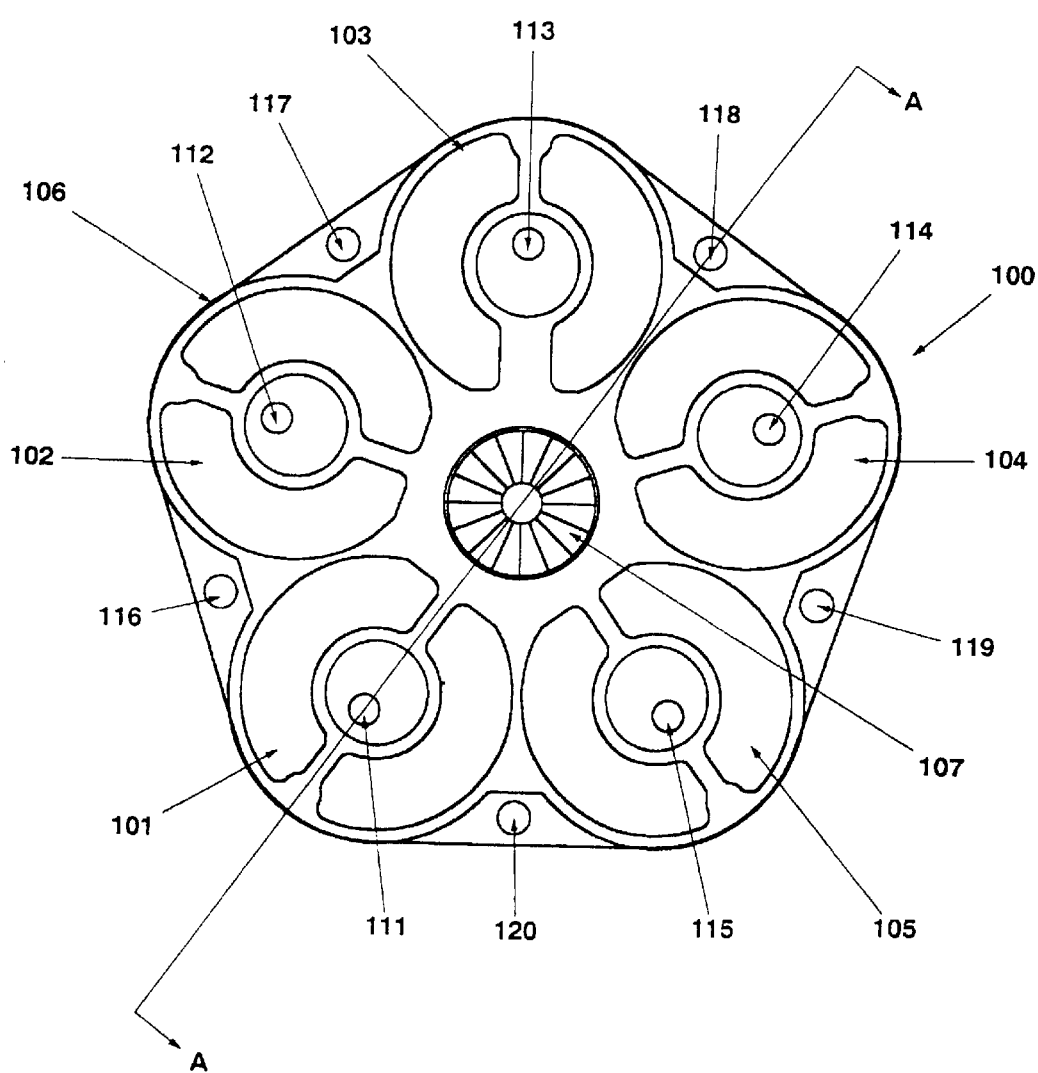
FIG. 1 is a plan view of the engine block looking from the exhaust end of the turbocharger.

Referring to the drawings it will be appreciated that an axial two-stroke motor and integral turbocharger according to the present invention may be implemented in various forms. The following embodiments are given by way of example only.

Figure 3:
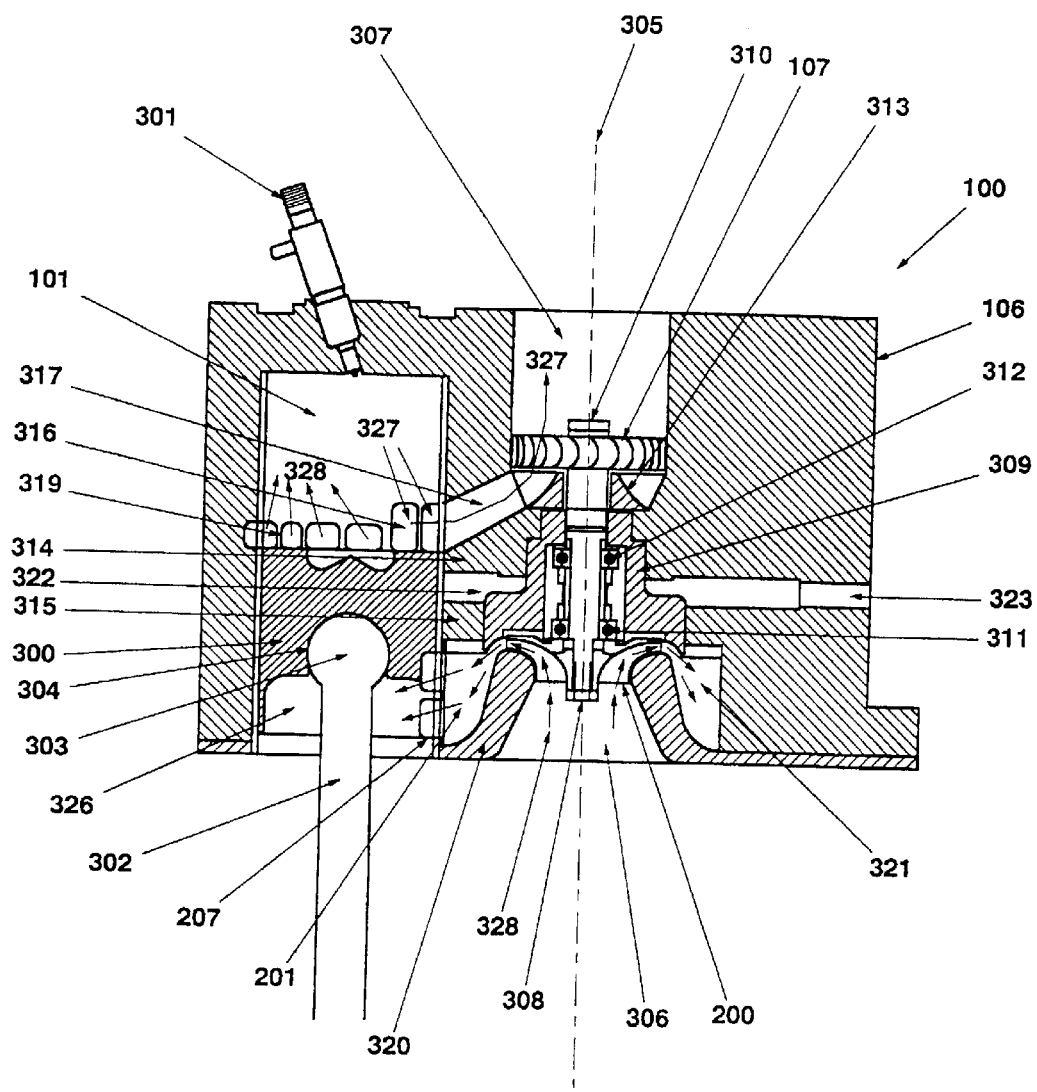
FIG. 3 is a section through a multi-cylinder axial engine block showing the turbocharger and one cylinder, on a view through A—A of FIG. 1.
Figure 4:
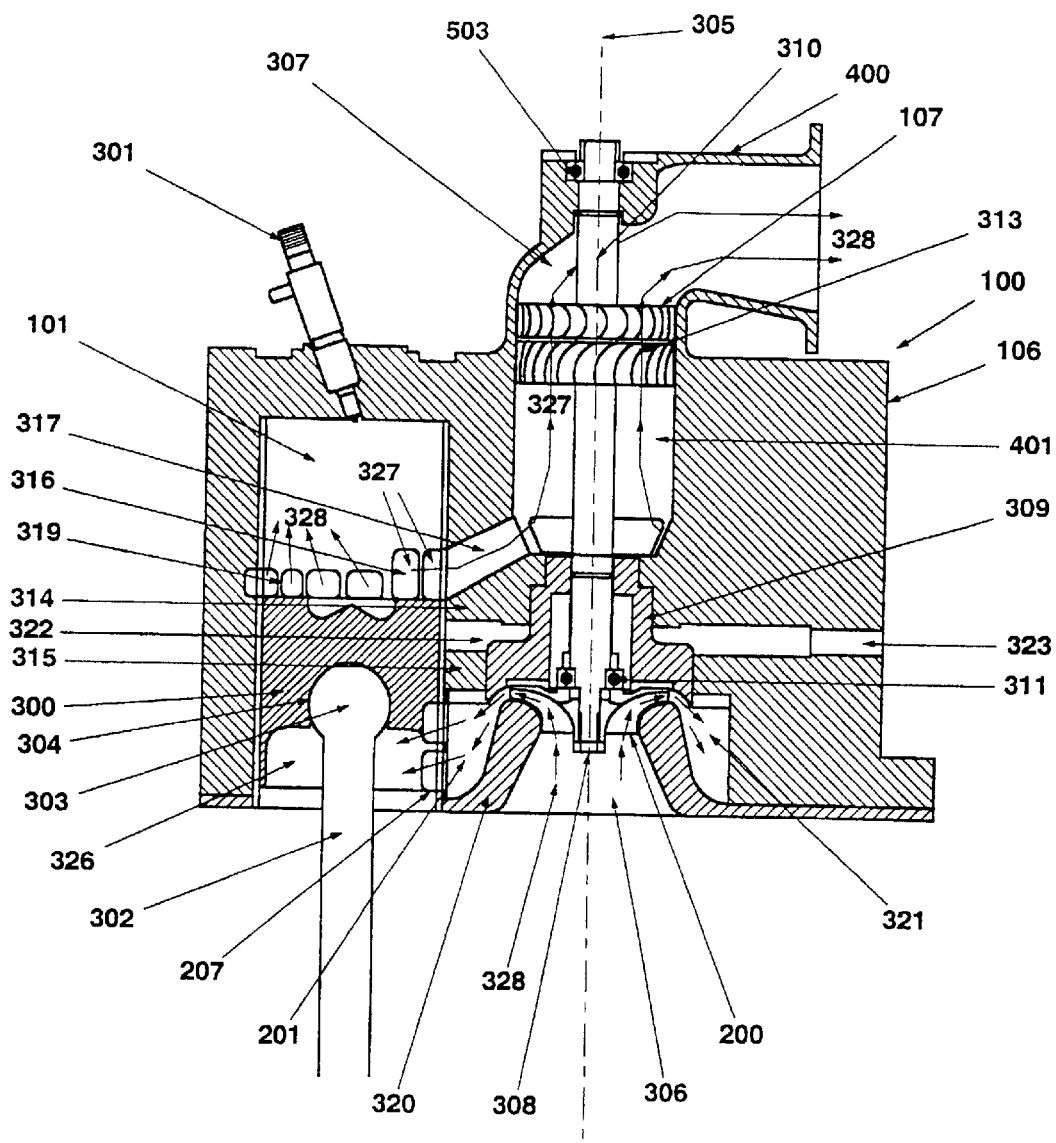
FIG. 4 is a section through an alternative embodiment of a multi-cylinder axial engine block showing the turbocharger, one cylinder with an exhaust duct extending outside the engine block.

FIG. 1 shows a top plan view of the axial two-stroke motor which includes an integral turbocharger according to the present invention. The axial two-stroke motor or engine 100 includes an engine block 106 preferably formed as an aluminium casting into which have been machined a plurality of cylinders 101–105. The cylinders are arranged in a substantially circular arrangement about a longitudinal axis 305 of the engine block 106 such that the cylinders are spaced substantially evenly about the axis 305. The longitudinal axis 305 is illustrated in FIGS. 3 and 4. It is necessary for the engine configuration to have more than two substantially evenly spaced cylinders however in the preferred embodiment there are five cylinders 101–105.

The axial-two stroke motor 100 also includes a turbocharger 308 which is disposed substantially within the engine block 106. Preferably the turbocharger 308 is aligned with the axis 305 of the engine block 106 such that it is surrounded by the evenly spaced cylinders 101–105.

FIG. 1 shows an end view of the turbocharger 308 in which an exhaust turbine 107 which forms part of the turbocharger is visible. This illustrates that the location of the turbocharger 308 which is disposed in the engine block 106, is substantially within the centre of the circularly arranged cylinders 101–105. The location of the entire turbocharger 308 is more clearly illustrated in FIGS. 3 and 4. Each cylinder 101–105 has a respective opening 111–115 for a fuel injector, spark plug or other injection or ignition related devices. The block also includes tie down bolt holes 116–120.

Figure 2:
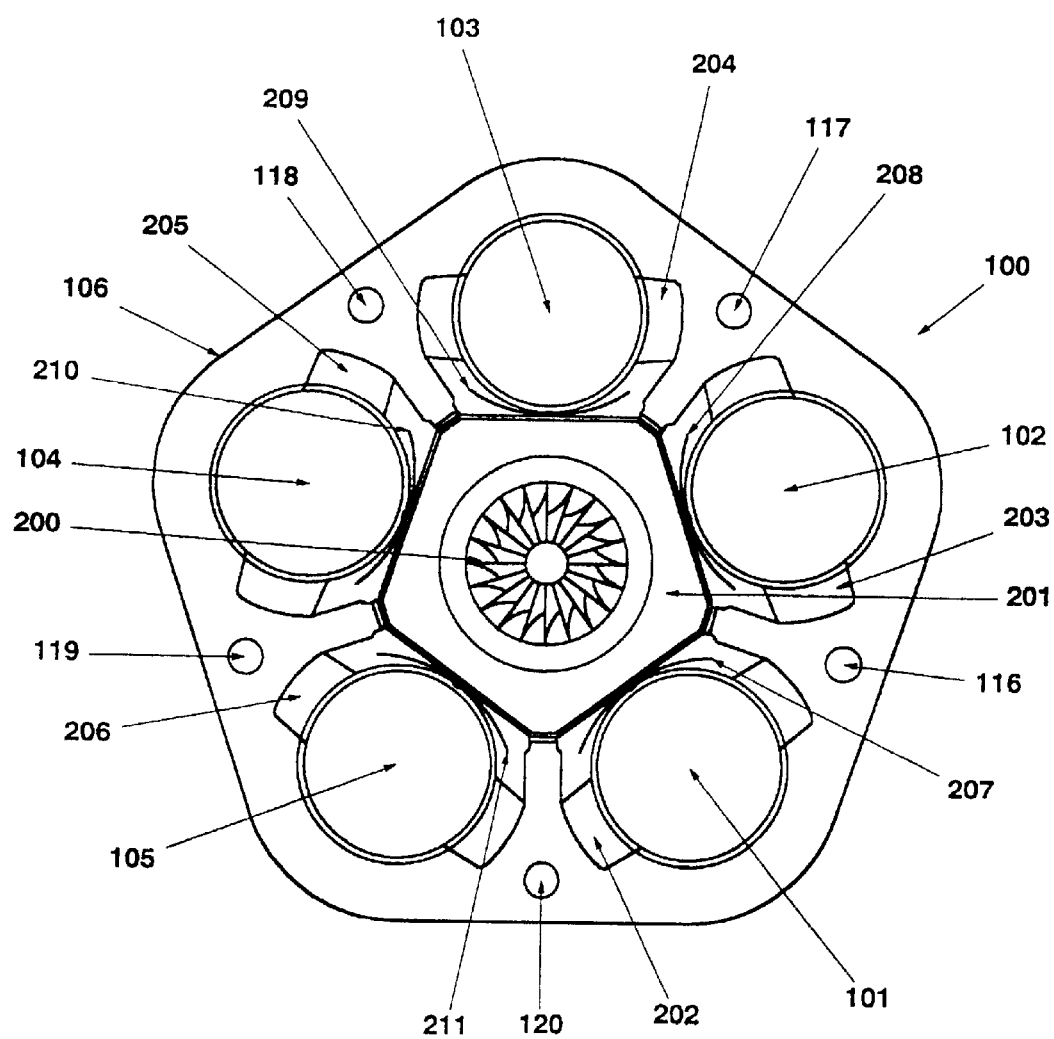
FIG. 2 is a part diagrammatical plan view of the engine block showing the radial compressor but with the air chest cover removed.

Similarly FIG. 2 shows the bottom plan view of the axial two-stroke engine 100. An air chest cover 320 has been removed to reveal a compression turbine 200 which forms part of the opposite end of the turbocharger 308. Formed between the compression turbine 301 and circularly arranged cylinders 101–105 is an air chest 201. The air chest 201 is linked to each cylinder 101–105 by way of transfer passages 202–206. Reed valves 207–211 which are disposed between each transfer passage 202–206 and the air chest 201, control the air flow between the air chest 201 and each transfer passage 202–206. The operation of the air chest 201, reed valves 207–211 and transfer passages 202–206 will be described in detail below.

The integral turbocharger 308 arrangement will now be described in more detail with reference to FIGS. 3 and 4. FIG. 3 shows a section view of a preferred embodiment of an engine block 106 with five evenly spaced cylinders 101–105 about an axis 305 of the engine block 106. The section has been taken through A—A shown in FIG. 1 and illustrates one 101 of the five cylinders 101–105.

Each cylinder 101–105 is substantially identical and therefore the description will refer to the visible cylinder 101 however it will be appreciated that the description will extend to all the cylinders 101–105 contained within the engine block 106. A piston 300 operates in a reciprocal motion within the cylinder 101. The cylinder 101 has associated with it a fuel injector 301 or other injection or ignition device which deliver fuel to the cylinder 101 and initiate combustion. In general terms these components operate essentially in a conventional manner for a two-stroke engine.

Associated with the piston 300 is a connecting rod 302. A ball joint 303 disposed at one end of the connecting rod 302 is located in an associated socket 304 disposed in a bottom portion of the piston 300. The reciprocal motion of the piston 300 and connecting rod 302 arrangement in the engine block 106 is transferred to rotational motion of an output shaft by any power transmission means suitable for an axial motor, for example a wobble plate arrangement.

Within the engine block there is a chamber aligned substantially axially with the longitudinal axis 305 of the engine block 106. The chamber forms an intake duct 306 and an exhaust collector duct 307. The turbocharger 308 is located within the chamber. The turbocharger 308 is located within the engine block 106 substantially in alignment with the axis 305 so that it is substantially parallel with the length of the cylinders 101–105. The turbocharger 308 includes a sub-assembly 309 which supports a rotatable turbine shaft 310, on one end of which is disposed the exhaust turbine 107 and on an opposite end is disposed the compression turbine or radial compressor 200. The turbocharger 308 includes compressor turbine-end bearings 311 and exhaust turbine-end bearings 312 which in the preferred embodiment are mounted inboard of the compressor 200 and exhaust turbines 107 respectively. In an alternative embodiment the bearings 311, 312 may be mounted outboard as is common practice in many engines used for marine purposes. In a preferred embodiment the turbocharger 308 also includes a stator 313 disposed substantially adjacent to the exhaust turbine 107 and aligned with the longitudinal axis 305 of the engine block 106.

In an alternative embodiment the stator 313 may be drilled to enable coolant and/or lubricant to be carried to the inboard mounted exhaust turbine-end bearings 312. The coolant may be water and the lubricant may be any standardly used lubricating oil.

In another alternative embodiment the turbine shaft 310 is hollow, which enables cooling air and oil mist to pass from the stator 313 and exhaust end bearing 312 to the compressor end bearing 311.

Preferably the chamber includes inwardly protruding machined circular surfaces 314, 315 also known as lands. The turbocharger sub-assembly 309 is mounted on the inwardly protruding surfaces 314, 315 such that the exhaust turbine 107 and stator 313 are positioned substantially in the exhaust duct 307 of the chamber, and the compression turbine 200 is positioned substantially in the intake duct 306 of the chamber. The exhaust turbine 107 and stator 313 may be located at any point within the exhaust duct 307.

Disposed in the wall of the cylinder 101 are one or more exhaust ports 316 which are linked to the exhaust duct 307 via an exhaust passage 317. Also disposed in the wall of the cylinder 101 is one or more inlet ports 319 which are linked to the air chest 201 via the transfer passage 202 as shown in FIG. 2. Reed valves 207 disposed between the transfer passage 202 and inlets to the air chest 201 control the flow of air between the air chest 201 and the transfer passage 202. The air chest 201 has an air chest cover 320. A diffusor 321 is formed between the air chest cover 320 and turbocharger sub-assembly 309.

FIG. 4 shows an alternative embodiment of the engine block 106 with an integral turbocharger 308. The exhaust duct 307 of the chamber extends beyond the main body of the engine block 106. An external portion 400 of the exhaust duct 307 is angled with respect to an internal portion 401 of the duct 307. The angle between the external 400 and internal 401 portions of the exhaust duct 307 is substantially 90°, however, it will be appreciated that other angles are possible.

The turbine shaft 310 extends through the internal portion 401 of the exhaust duct 307 and is rotatably supported in a housing formed with the external portion 400 of the exhaust duct 307. The turbine shaft 310 rotates on end bearings 503. The stator 313 and exhaust turbine 307 are disposed on the turbine shaft 310 approximately at the border between the internal 401 and external 400 portions of the exhaust duct 307. It will be appreciated that the stator 313 and exhaust turbine 307 may be located at any point within the exhaust duct 307.

Operation of the preferred embodiment of the present invention will now be described with reference to cylinder 101, however it will be appreciated that each cylinder is substantially identical and therefore any description with regard to the cylinder 101 should be considered to extend to the remaining cylinders.

The turbocharger is driven by exhaust gases 327 which are expelled from the cylinder 101. During the exhaust phase of the engine cycle, the piston 300 travels downwards within the cylinder 101 and exposes one or more exhaust ports 316 disposed in the cylinder 101 wall. The exhaust gases 327 from the combustion cycle are expelled from cylinder 101 through the one or more exhaust ports 316. The exhaust gases 327 pass through the exhaust passage 317, where the exhaust gases 327 pass through the stator 313 which guides the exhaust gases 327 directly onto the exhaust turbine 107. Once the exhaust gases 327 have impacted on the exhaust turbine 107 they pass through to the exhaust duct 307.

The rotation of the exhaust turbine 107 rotates the turbine shaft 310 and thus drives the compression turbine 200. The rotating compression turbine 200 draws air 328 through the intake duct 306 and passes the compressed air 328 through the diffusor 321 into the air chest 201. As the piston 300 rises on the intake stroke the differential pressure opens the reed valves 207 and enables the air 328 from the air chest 201 to transfer to the volume 326 underneath the piston 300. During the air transfer portion of the combustion cycle, the piston 300 travels downwards within the cylinder 101 which pressurises the air 328 underneath the piston, thus closing the reed valves 207. As the piston 300 travels further the inlet ports 319 disposed in the wall of the cylinder 101 are exposed. The compressed air 328 in the volume 326 underneath the piston 300 is then transferred through the transfer passage 202–206 and the one or more inlet ports 319 into the cylinder 101.

In a further preferred embodiment the present invention includes a coolant jacket 322. The jacket 322 is formed by a combination of the turbocharger sub-assembly 309, inwardly protruding surfaces 314, 315 and engine block 106. The normal coolant used is water which can be fed into the coolant jacket 322 via a coolant entry port 323. The coolant circulates through the jacket 322 to enable heat dissipation from the turbocharger 308. The turbocharger sub-assembly 309 in combination with the mass of metal comprising the inwardly protruding surfaces 314, 315 and engine block 106 provides a sufficient heat sink to enable circulating coolant to dissipate heat from the turbocharger 308 upon cessation of the engine 100 operation. The dissipation of heat from the turbocharger 308 in this manner will minimise the likelihood of carbonisation of lubricant used within the turbocharger 308.

In a further embodiment a water cooling jacket may surround the external portion 400 of exhaust duct 307 to provide cooling for turbine shaft 310 and bearing 503.

What is claimed is:

1. An axial two-stroke motor including:
   an engine block with more than two cylinders spaced substantially evenly about a central axis of the block, each cylinder having one or more exhaust ports,
   a chamber within the block, the chamber forming an exhaust duct and an intake duct, and
   a turbocharger including an exhaust turbine and compression turbine,
   wherein the turbocharger is disposed substantially within the chamber such that the compression turbine is positioned substantially within the intake duct and the exhaust turbine is positioned substantially within the exhaust duct, the exhaust turbine being located such that exhaust from each exhaust port can drive the exhaust turbine.

2. An axial two-stroke motor according to claim 1 wherein the turbocharger includes a sub-assembly, the sub-assembly being mounted on inwardly protruding machined circular surfaces located within the chamber.

3. An axial two-stroke motor according to claim 1 wherein the turbocharger further includes a stator which resides substantially within the exhaust duct such that exhaust from each exhaust port can pass to the exhaust turbine via the stator.

4. An axial two-stroke motor according to claim 1 wherein the exhaust duct formed by the chamber extends at least partially outside the engine block.

5. An axial two-stroke motor according to claim 3 wherein the stator is drilled to enable the stator to carry coolant or lubricant to end-bearings of the turbine.

6. An axial two-stroke motor according to claim 2 wherein the surfaces form, in combination with the block and turbocharger sub-assembly, a coolant jacket in which coolant is circulated to cool the turbocharger.

7. An axial two-stroke motor according to claim 1 further including an exhaust duct which extends outside the block and a coolant jacket is provided to cool an outboard exhaust end bearing.

8. An axial two-stroke motor according to claim 1 wherein turbine end bearings are mounted inboard or outboard of the turbines.

9. A method for transferring a combustible charge to cylinders disposed in an engine block of an axial motor including the steps of:
   directing exhaust gases from the cylinders onto an exhaust turbine of a turbocharger located substantially within the engine block,
   rotating the exhaust turbine in response to the exhaust gases and thereby rotating a compressor turbine also within the engine block,
   drawing air through an intake duct of the block by way of the rotating compressor turbine, and
   directing the air into the one or more cylinders of the engine block.

* * * * *